No. 734,748. PATENTED JULY 28, 1903.
H. G. RANDALL.
ICE MAKING MACHINE.
APPLICATION FILED JAN. 20, 1903.
NO MODEL. 2 SHEETS—SHEET 1.

Witnesses
Chas. K. Davies
Gustav R. Thompson

Inventor
Henry G. Randall
by Mauro Cameron & Lewis
Attorneys

No. 734,748. PATENTED JULY 28, 1903.
H. G. RANDALL.
ICE MAKING MACHINE.
APPLICATION FILED JAN. 20, 1903.
NO MODEL. 2 SHEETS—SHEET 2.

Witnesses
Chas. K. Davies.
Gustave R. Thompson.

Inventor
Henry G. Randall
by Mauro Cameron & Lewis
Attorneys

No. 734,748.

Patented July 28, 1903.

UNITED STATES PATENT OFFICE.

HENRY GASTON RANDALL, OF BRIDGEPORT, CONNECTICUT, ASSIGNOR TO WILLIAM A. SWEETSER AND HENRY S. ELLIOTT, OF NEW YORK, N. Y.

ICE-MAKING MACHINE.

SPECIFICATION forming part of Letters Patent No. 734,748, dated July 28, 1903.

Application filed January 20, 1903. Serial No. 139,796. (No model.)

*To all whom it may concern:*

Be it known that I, HENRY GASTON RANDALL, a resident of Bridgeport, Connecticut, have invented a new and useful Improvement in Ice-Making Machines, which invention is fully set forth in the following specification.

My invention relates to hand-operated ice-machines, and more particularly to that class of ice-machines which employ a vacuum in connection with a hygroscopic substance to produce the refrigerative temperature, and has for its object to provide a machine of the class named which shall be so simple in its construction as to be cheaply manufactured and easy to keep in repair, while at the same time it shall be effective in its operation and produce ice at a minimum cost.

With this object in view the invention consists of a chamber for containing the water or other liquid to be frozen, (which chamber is hereinafter designated the "ice-chamber,") a second chamber inclosing the ice-chamber and containing the hygroscopic material and which is closed air-tight when in operation, a vacuum-pump in communication with said second chamber for producing a vacuum therein, and connections between the pump and hygroscopic vacuum-chamber, whereby the latter is rocked or agitated by the working of the vacuum-pump.

I have illustrated in the accompanying drawings one mechanical expression of the inventive idea involved; but such drawings are to be taken as illustrative only and not as defining the scope of the invention, reliance being placed upon the claims for this purpose.

Figure 1:
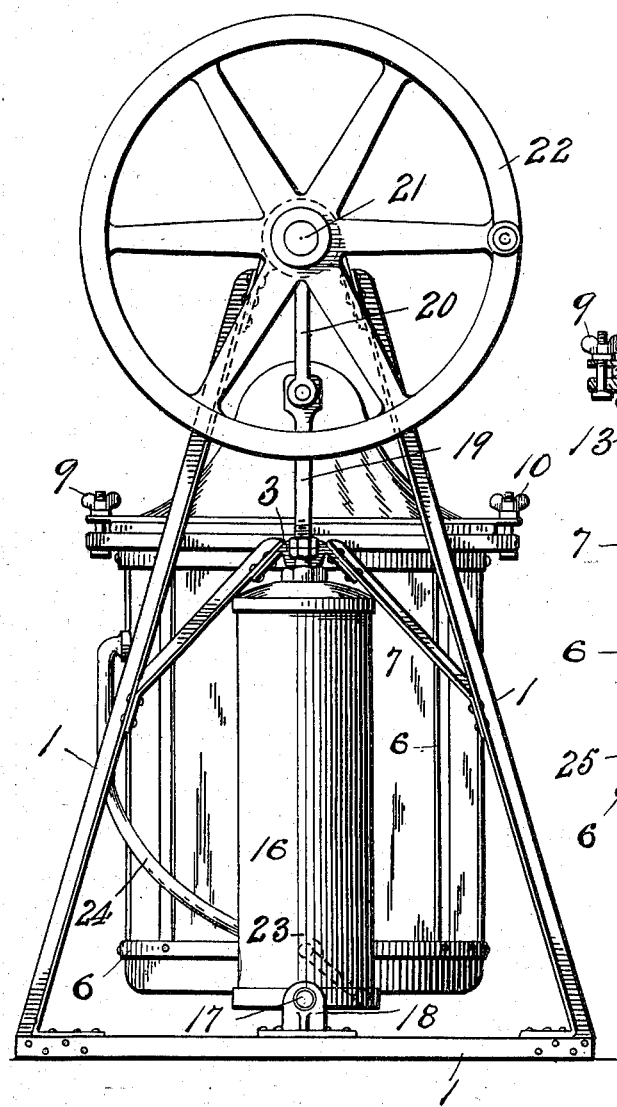
Figure 2:
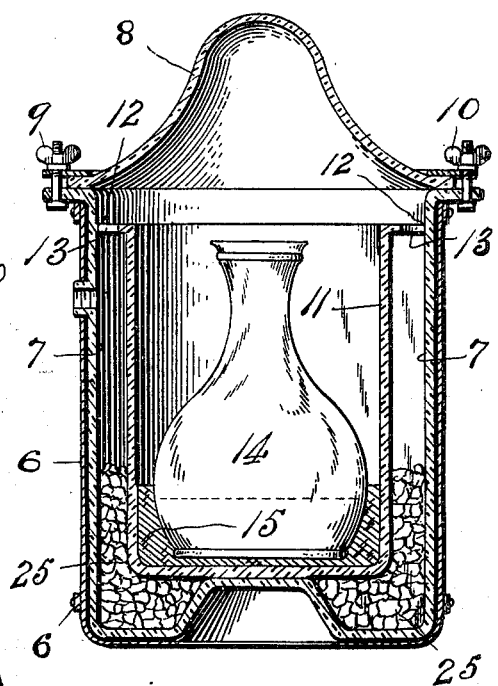
Figure 3:
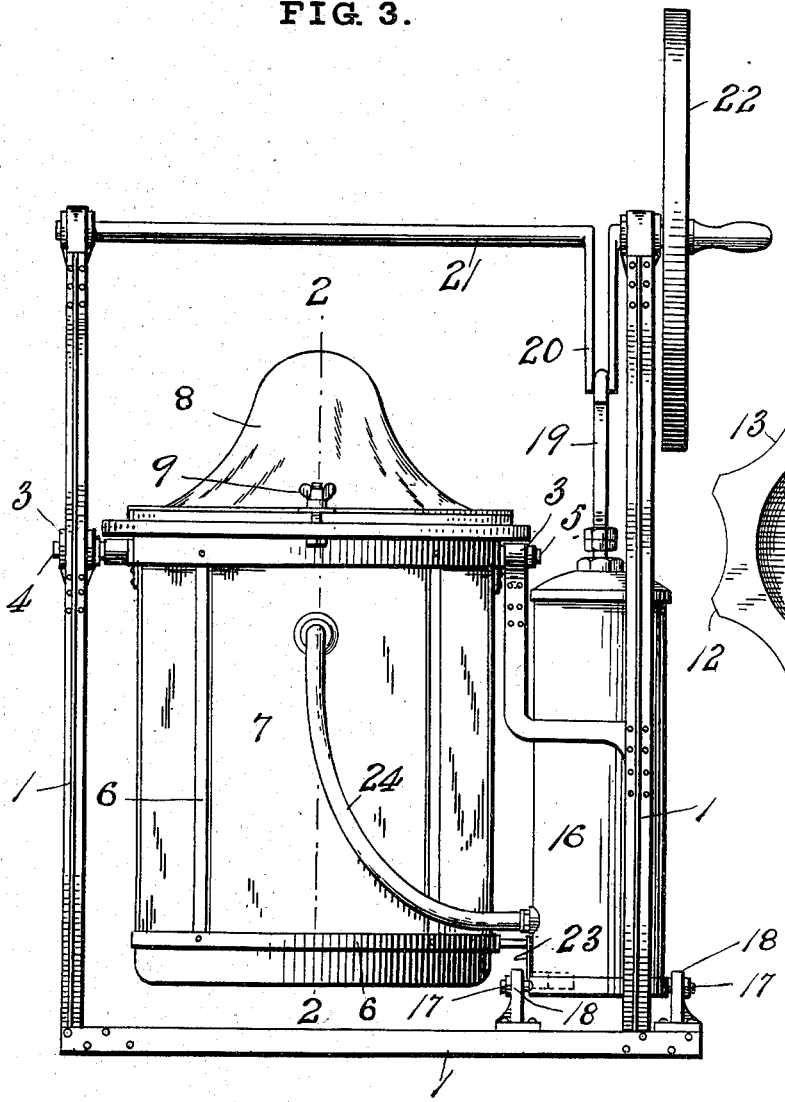
Figure 4:
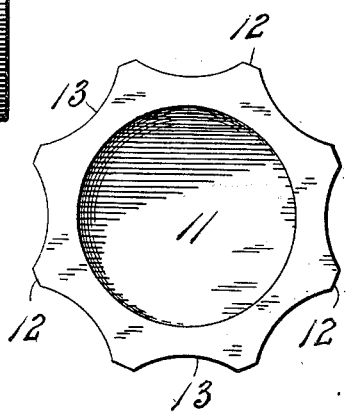

In said drawings, Figure 1 is a side elevation of my improved machine. Fig. 2 is a sectional view thereof on the line 2 2, Fig. 3. Fig. 3 is a front elevation of the machine, and Fig. 4 is a detail.

Referring to the drawings, 1 is a framework, preferably made of light angle-iron and having bearings 3 3 for the trunnions 4 and 5 of a basket 6, preferably also of iron. Supported in the basket 6 is a vessel 7, made of material, as glass, capable of resisting the action of chemicals, provided with a top 8, which may be closed air-tight by screw-clamps 9 and 10, suitable packing being employed, if necessary, to make the joint air-tight. Within the vessel 7 is a second vessel 11, of material not affected by chemicals, as glass or porcelain, which vessel has an outwardly-extending flange 12, which fits snugly within the vessel 7, suitable openings 13 being provided, so as to afford free communication between the spaces above and below said flange 12. Within the vessel 11 is placed any suitable vessel 14 for containing the water or other liquid to be frozen, suitable material 15 which is a non-conductor of heat, as asbestos, being interposed between the two vessels. A portion of the space between vessels 11 and 14 is filled with some suitable hygroscopic material 25, such as chlorid of calcium.

Mounted on the frame 1 is a vacuum-pump 16, provided with trunnions 17 17 near its base, which trunnions rest in bearings 18 18 on the frame 1. The piston-rod 19 to said pump is connected to a crank 20 on a shaft 21, having bearings in the frame 1 and operated by a hand-wheel 22.

The bottom of the basket 6 is connected to the bottom of the pump 16 by a link 23, engaging wrist-pins on the pump and basket, respectively, and a flexible pipe 24 leads from the suction end of the pump to the vessel 7.

The operation of the machine is as follows: Water or other liquid to be frozen being placed in the vessel 14 and chlorid of calcium or other suitable hygroscopic material in the vessel 7, the lid or cover 8 is closed air-tight and the hand-wheel 22 turned to operate the air-pump to produce the required vacuum in the vessels 7, 11, and 14. As the hand-pump is operated by the crank 20 the pump is caused to rock on its trunnions, and by reason of the link connection 23 this causes the basket 6 and the vessel 7 to also rock on trunnions 4 and 5, thereby agitating the hygroscopic material 25. This agitation of the hygroscopic material causes new surfaces thereof to be presented to absorb the moisture or vapor resulting from the rapid evaporation of the liquid in vessel 14. The vacuum maintained by the pump and the absorption of the vapor by the hygroscopic material causes such rapid evaporation of the liquid in the vessel as to speedily lower the temperature thereof to the freezing-point.

It will be observed that the construction and operation of the machine is extremely simple, requiring cheap materials and the minimum amount of power to operate it.

Having thus described the invention, I claim—

1. In an ice-making machine, the combination of a vacuum-chamber, having a hygroscopic material therein, an ice-chamber contained in said vacuum-chamber, a vacuum-pump connected to said vacuum and ice chambers, and means simultaneously rocking the vacuum-chamber and actuating the pump.

2. In an ice-machine, the combination of a vacuum-chamber hung on trunnions and containing a hygroscopic material, an ice-chamber therein, a vacuum-pump also mounted on trunnions, a conduit leading from said vacuum-chamber to said pump, means for simultaneously operating said pump and rocking it on its trunnions, and connections between said pump and vacuum-chamber, whereby the rocking of the pump rocks the said chamber on its trunnions.

3. In an ice-making machine, the combination of a vacuum-chamber containing a hygroscopic material and an ice-chamber, and means simultaneously agitating said vacuum-chamber and producing a vacuum therein.

4. In an ice-making machine, the combination of a rocking vacuum-chamber containing a hygroscopic material and an ice-chamber, and a vacuum-pump operating to simultaneously rock said vacuum-chamber and produce a vacuum therein.

5. In an ice-making machine, the combination of a frame, a rocking vacuum-chamber containing a hygroscopic material and an ice-chamber, non-heat-conducting material interposed between said ice-chamber and hygroscopic material, a rocking vacuum-pump, and means for operating and rocking the same, and connections between the pump and vacuum-chamber, whereby the said chamber is rocked.

6. In an ice-making machine, the combination of a frame, a basket hung on trunnions in said frame, a vacuum-chamber supported by said basket, hygroscopic material and an ice-chamber in said vacuum-chamber, a rocking vacuum-pump also supported on said frame, a flexible pipe connecting the pump and vacuum-chamber, a link connecting the pump and basket, and means simultaneously rocking and operating the pump.

In testimony whereof I have signed this specification in the presence of two subscribing witnesses.

HENRY GASTON RANDALL.

Witnesses:
WM. A. SWEETSER,
M. MAYLAND.